United States Patent
Johdai et al.

(12)

(10) Patent No.: US 6,254,087 B1
(45) Date of Patent: Jul. 3, 2001

(54) SHEET TRANSPORT DEVICE AND SHEET TRANSPORT METHOD

(75) Inventors: Akiyoshi Johdai, Toyokawa; Tohru Murakami, Okazaki, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/407,175

(22) Filed: Sep. 28, 1999

(30) Foreign Application Priority Data

Sep. 30, 1998 (JP) .................................................. 10-277582

(51) Int. Cl.$^7$ ............................ B65H 29/00; G03G 15/00
(52) U.S. Cl. ......................... 271/184; 271/186; 399/364
(58) Field of Search ................................. 271/4.09, 184, 271/186; 399/364

(56) References Cited

U.S. PATENT DOCUMENTS

| | | | |
|---|---|---|---|
| 4,849,790 | 7/1989 | Ito ........................................ | 355/321 |
| 4,921,239 | 5/1990 | Okui et al. ........................... | 271/186 |
| 5,197,724 | * 3/1993 | Kitijama et al. .................... | 271/3.1 X |
| 5,534,989 | * 7/1996 | Rubscha et al. ................... | 355/309 X |
| 5,597,153 | * 1/1997 | Maruyama et al. .............. | 271/4.1 X |
| 5,784,680 | * 6/1998 | Taruki .............................. | 399/374 X |
| 6,029,969 | * 2/2000 | Saitoh et al. .................... | 271/4.02 X |

FOREIGN PATENT DOCUMENTS

| | | |
|---|---|---|
| 4-28677 | * 1/1992 | (JP) . |
| 4-255866 | 9/1992 | (JP) . |
| 5-249780 | 9/1993 | (JP) . |
| 5-338892 | * 12/1993 | (JP) . |

* cited by examiner

*Primary Examiner*—Christopher P. Ellis
*Assistant Examiner*—Kenneth W Bower
(74) *Attorney, Agent, or Firm*—Burns, Doane, Swecker & Mathis, LLP

(57) ABSTRACT

According to a document transport device of a preferred embodiment, when reading images of a plurality of one-sided documents, these one-sided documents are accommodated in a first accommodating portion with the document surface facing upward. The held documents are fed sequentially from the uppermost document to the first document transport path, inverted front-to-back, and transported with the document surface facing downward to the predetermined position, i.e., the document reading position. When the reading of the document is completed at the document reading position, the read document is transported to a second document transport path, inverted front-to-back, and accommodated in a second accommodating portion with the document surface facing upward. Thereafter, the document is transported to a third document transport path, inverted front-to-back, and accommodated in a third document accommodating portion with the document surface facing downward. The second and subsequent documents are similarly transported, and stacked in the third accommodating portion with the document surfaces facing downward.

12 Claims, 2 Drawing Sheets

SHEET TRANSPORT DEVICE AND SHEET TRANSPORT METHOD

This application is based on Patent Application No. H10-277582 filed in Japan, the content of which is hereby incorporated by reference.

BACKGROUND OF THE INVENTION

1. Field of the Invention

The present invention relates to a sheet transport device and sheet transport method for use in image forming apparatuses such as copiers, scanners, facsimile machine and the like.

2. Description of the Related Art

Document transport devices installed in image processing apparatuses having both a document feeding tray and a document discharge tray disposed above the platen of the image reading unit of the image processing apparatus are hereinafter referred to as "wingless-type document transport devices." Furthermore, document transport devices having at least one tray among the document feeding tray and the document discharge tray which protrudes from the area above the platen are hereinafter referred to as "wing-type document transport devices." The wingless-type document transport device is advantageous in that it has a smaller footprint so as to more effectively utilize space compared to the wing-type document transport device.

Document transport systems can be classified from the perspective of the document feeding sequence into "first page systems" wherein a plurality of document pages are fed from the first page, and "last page systems" wherein the last page of the plurality of document pages is fed first. When comparing the first page system and the last page system, there is no problem using either system in copiers which simply make copies, but the first page system is desirable in apparatuses which process read information in the reading sequence as is the case in scanners and facsimile machines.

The wingless-type document transport devices invert front-to-back a document placed on the document feed tray and feed the document to the image reader unit, then again invert the document back-to-front after the image is read and eject the document to a document discharge tray. Accordingly, disadvantages arise when using the first page system. Specifically, when automatically reading a plurality of one-sided documents, the plurality of one-sided documents are stacked on a document tray with the document surface facing upward, and the uppermost document is fed sequentially from the first page. The documents which have been read are sequentially ejected to the document discharge tray with the document surface face upward. As a result the first page document becomes the lowermost document in the stack with the document surface facing upward. For this reason the operator must re-order the sequence of the documents after the documents have been read.

OBJECTS AND SUMMARY

In view of the aforesaid disadvantages, an object of the present invention is to provide an improved sheet transport device and sheet transporting method.

Another object of the present invention is to provide a sheet transport device and sheet transporting method which do not require reordering of the sequence of sheets ejected to a sheet discharge tray.

Yet another object of the present invention is to provide a sheet transport device and sheet transport method having excellent operating characteristics using the first page system in wingless-type sheet transport devices.

These and other objects of the present invention are attained by providing a sheet transport device for transporting sheets to a predetermined position, said sheet transport device comprising:

a first accommodating portion which is disposed above the predetermined position and which accommodates a plurality of sheets;

a second accommodating portion disposed above the predetermined position;

a third accommodating portion disposed above the predetermined position;

a first sheet transport path for feeding the plurality of sheets accommodated in said first accommodating portion sequentially from the uppermost sheet, inverting the sheets front-to-back, and transporting the sheets to the predetermined position;

a second sheet transport path for inverting front-to-back the sheet which is transported to the predetermined position by said first transport path, and transporting the sheet to said second accommodating portion; and a third sheet transport path for inverting front-to-back the sheet which is accommodated by said second accommodating portion, and transporting the sheet to said third accommodating portion.

According to this sheet transport device, when reading the images of a plurality of one-sided documents, these one-sided documents are accommodated in a first accommodating portion with the document surface facing upward. The held documents are fed sequentially from the uppermost document to the first document transport path, inverted front-to-back, and transported with the document surface facing downward to the predetermined position, i.e., the document reading position. When the reading of the document is completed at the document reading position, the read document is transported to the second document transport path, inverted front-to-back, and accommodated in the second accommodating portion with the document surface facing upward. Thereafter, the document is transported to the third document transport path, inverted front-to-back, and accommodated in the third accommodating portion with the document surface facing downward. The second and subsequent documents are similarly transported, and stacked in the third accommodating portion with the document surfaces facing downward.

These objects of the present invention are attained by providing a sheet transport device for transporting sheets to a predetermined position, said sheet transport device comprising:

a first accommodating portion which is disposed above the predetermined position and which accommodates a plurality of sheets;

a second accommodating portion disposed above the predetermined position;

a third accommodating portion disposed above the predetermined position;

a fourth accommodating portion disposed above the predetermined position;

a first sheet transport path for feeding the plurality of sheets accommodated in said first accommodating portion sequentially from the lowermost sheet, inverting the sheet front-to-back, and transporting the sheet to said second accommodating portion;

a second sheet transport path for inverting front-to-back a sheet which is accommodated in said second accommodating portion, and transporting the sheet to the predetermined position;

a third sheet transport path for inverting front-to-back the sheet which is transported to the predetermined position by said second transport path, and transporting the sheet to said third accommodating portion; and a fourth sheet transport path for inverting front-to-back the sheet accommodated in said third accommodating portion, and transporting the sheet to the fourth accommodating portion.

According to this sheet transport device, when reading the images of a plurality of one-sided documents, these one-sided documents are accommodated in a first accommodating portion with the document surface facing downward. The accommodated documents are fed sequentially from the lowermost document via the first document transport path, inverted front-to-back, and accommodated with the document surface facing upward in the second accommodating portion. The document in the second accommodating portion is transported via the second document transport path, inverted front-to-back, and transported with the document surface facing downward to the predetermined position, i.e., the document reading position. When the reading of the document is completed at the document reading position, the read document is transported via the third document transport path, inverted front-to-back, and accommodated in the third accommodating portion with the document surface facing upward. Thereafter, the document in the third accommodating portion is transported via the fourth document transport path, inverted front-to-back, and accommodated in the fourth accommodating portion with the document surface facing downward. The second and subsequent documents are similarly transported, and stacked in the fourth accommodating portion with the document surfaces facing downward.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

Figure 1:
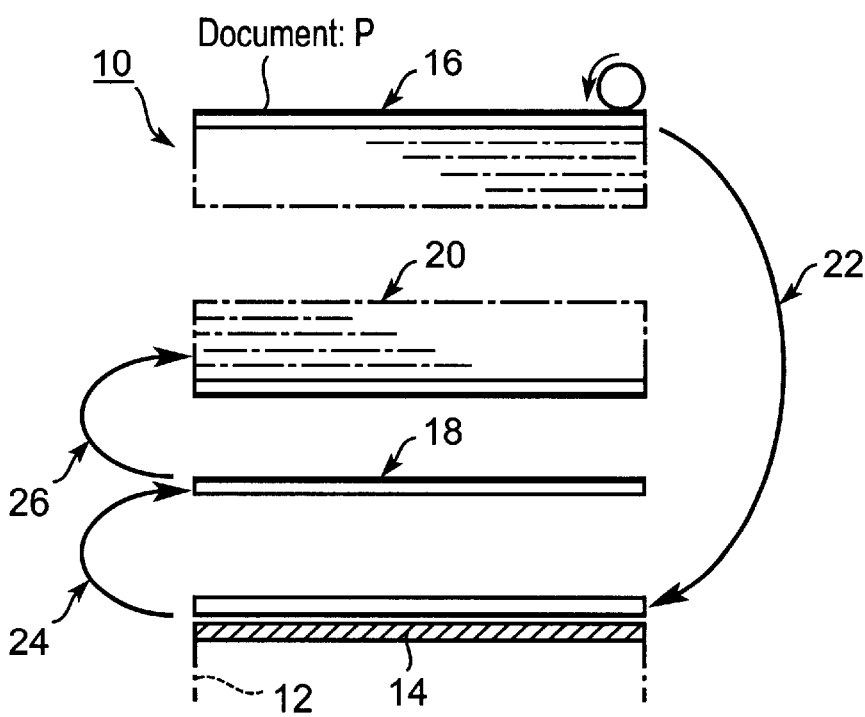
FIG. 1 is a conceptual drawing showing a first mode of the document transport device.

FIG. 1 is a conceptual drawing showing a first mode of the document transport device. The document transport device 10 is arranged above the platen 14 of the document reading unit of the image forming apparatus 12, e.g., a copier, scanner, facsimile machine or the like. In this arrangement, above the platen 14 are arranged a first document holder 16, a second document holder 18, and a third document holder 20. Sequentially from the top are disposed the first document holder 16, the third document holder 20, and the second document holder 18. The document transport device 10 is provided with a first document transport path 22 for inverting front-to-back the documents from the first document holder 16 and transporting them to the document reader 14, a second document transport path 22 for inverting front-to-back the documents from the document reader 14 and transporting them to the second document holder 18, and a third document transport path 26 for inverting front-to-back the documents from the second document holder 18 and transporting them to the third document holder 20.

When reading a one-sided document P, the document feeder 10 accommodates a plurality of document pages P stacked in the page sequence in the first document holder 16 with the document surface facing upward. The plurality of documents P are stacked in the first document holder 16 with the first page document surface facing upward. The documents held in the first document holder 16 are fed sequentially from the uppermost document, i.e., the first page, to the first document transport path 22. A fed document P is inverted front-to-back by being transported along the first transport path 22, so as to arrive at the document reader 14 with the document surface facing downward. When document reading ends by the document processing device 12, the document P is fed from the document reader 14 to the second document transport path 24. The fed document P is transported along the second transport path 24, inverted front-to-back, and transported to the second document holder 18. Thereafter, the document P is transported from the second document holder 18 along the third document transport path 26, inverted front-to-back, so as to be accommodated in the third document holder 20 with the document surface facing downward.

Figure 2:
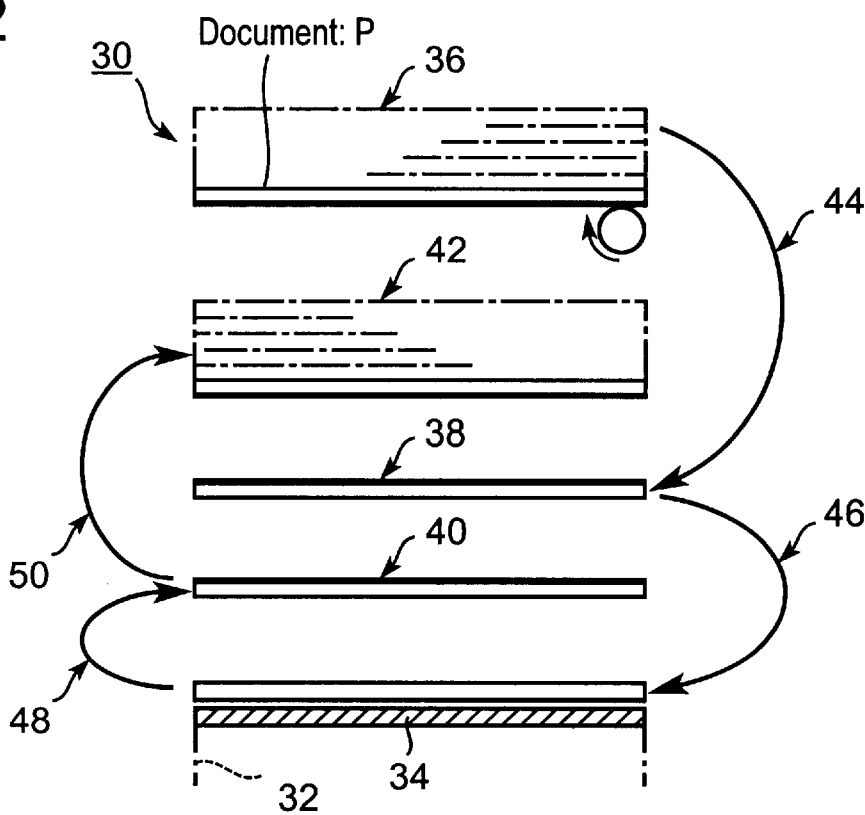
FIG. 2 is a conceptual drawing showing a second mode of the document transport device.

FIG. 2 shows a second mode of the document transport device. The document transport device 30 provides a first document holder 36, a second document holder 38, a third document holder 40, and a fourth document holder 42 arranged above the document reader 34 of the image processing device 32. Sequentially from the top are disposed the first document holder 36, the fourth document holder 42, the second document holder 38, and the third document holder 40. The document transport device 30 is provided with a first document transport path 44 for inverting front-to-back the documents from the first document holder 36 and transporting them to the second document holder 38, a second document transport path 46 for inverting front-to-back the documents accommodated in the second document holder 38 and transporting them to the document reader 34, a third document transport path 48 for inverting front-to-back the documents from the document reader 34 and transporting them to the third document holder 40, and a fourth document transport path 50 for inverting front-to-back the documents accommodated in the third document holder 40 and transporting them to the fourth document holder 42.

When reading a one-sided document P, the document feeder 30 accommodates a plurality of document pages P stacked in the page sequence in the first document holder 36 with the document surface facing downward. The plurality of documents P are stacked in the first document holder 36 with the first page document surface facing downward. The documents held in the first document holder 36 are fed sequentially from the lowermost document, i.e., the first page, to the first document transport path 44. A fed document P is inverted front-to-back by being transported along the first transport path 44, so as to be accommodated in the second document holder 38 with the document surface facing upward. Then, the document P is inverted front-to-back by being transported from the second document holder 38 via the second transport path 46, so as to arrive at the document reader 34 with the document surface facing downward. When document reading ends by the document processing device 32, the document P is fed from the document reader 34 and inverted front-to-back by the third transport path 48, and is accommodated in the third document holder 40. Thereafter, the document P is transported from the third document holder 40 along the fourth document transport path 50, and inverted front-to-back, so as to be accommodated in the fourth document holder 42 with the document surface facing downward.

Figure 3:
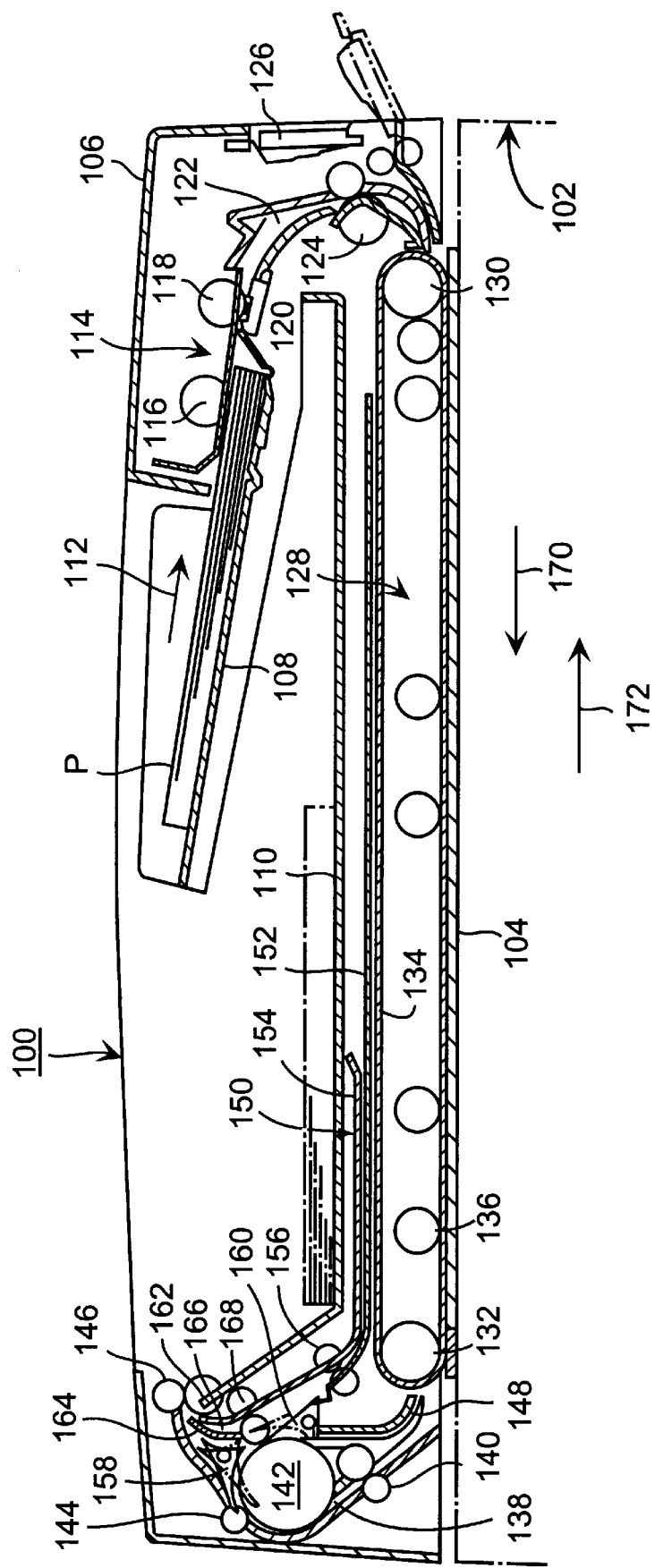
FIG. 3 is a section view showing the construction of the document transport device.

FIG. 3 is a section view of the document transport device 100 of the first mode described above. The document transport device 100 is arranged above the platen of a document reader 104 of an idealized image processing device, e.g., a copier, facsimile, or scanner 102. The document transport device 100 is connected to the image processing apparatus so as to be freely oscillatable via a hinge provided on the interior side in the drawing, so as to allow the platen 104 to be opened as necessary.

The document transport device 100, in brief, has an approximately rectangular box-like housing, and is provided with a document feed tray 108 on the top section on the upper right side of the drawing. Below the document feed tray 108 is arranged a document discharge tray 110, for accommodating the stacked documents P after the document have been read. A document feeder 114 is positioned on the document feeding end of the document feed tray 108, i.e., at the end of the tray 108 in the document feeding direction indicated by the arrow 112, for feeding the documents stacked in the document feed tray 108 sheet-by-sheet.

The document feeder 114 is provided with a rotatable document take-up roller 116 for feeding the document and disposed in contact with the document P at the uppermost position of the stack of documents P placed on the document feed tray 108. On the downstream side of the document take-up roller 116 in the document transport direction is provided a pad 118 disposed adjacent to the take-up roller 116 for preventing a plurality of sheets of the documents from being simultaneously taken up. On the downstream side of the roller 116 in the document transport direction is provided a U-turn path 122 for guiding the document P to the platen 104. Within the path 122 is arranged a timing roller 124 for regulating the document feed timing to the platen 104.

The document transport device 100 is provided with a manual document feed tray 126 on the path 122 side. The manual feed tray 126 normally is accommodated in a cavity formed in the housing 106, and is closed. The manual feed tray 126 is opened at a position indicated by the hypothetical line as necessary, and a document is manually inserted along the opened manual feed tray 126 and is transported to the platen 104.

Above the platen 104 and below the document discharge tray 110 is positioned a document transporting unit 128 capable of transporting a document P along the platen 104. The document transporting unit 128 comprises rollers 130 and 132 positioned at bilateral ends of the document transporting unit 128, and an endless belt 134 rove around the rollers 130 and 132. A plurality of rollers 136 are arranged medially to the rollers 130 and 132, and these rollers 136 press the belt 134 against the platen 104. A document P is gripped between the belt 134 and the platen 104 and is transported by thew operation of the belt 134.

A U-turn path 138 is provided on the opposite side of the document feeder 114 and between the document transport unit 128 so as to eject a read document P to the document discharge tray 110 provided above the document transport unit 128. A pair of feed rollers 140, a large-diameter inverting roller 142, a roller 144 in contact with the inverting roller 142, and a pair of discharge rollers 146 are arranged between the document transport unit 128 and the document discharge tray 110 along the path 138, so as to guide a document P fed from the platen 104 into the discharge tray 110 along the path 138.

Provided on the opposite side from the path 138 and between the inverting roller 142 are a re-feeding path 148 for inverting front-to-back the document P and re-feeding the document to the platen 104, and a document inverting unit 150 for inverting a document P front-to-back and subsequently ejecting the document to the document discharge tray 110. The document inverting unit 150 comprises a bottom guide 152 and a top guide 154 extending between the document discharge tray 110 and the document transport unit 128, and a pair of feed rollers 156 for feeding/receiving the document P between the guide rollers 152 and 154.

A first separation member 158 which is retractable relative to the path 138 is provided on the side of the path 138 for receiving a document P transported along the path 138 and directing the document to the re-feeding path 148 or the document inverting unit 150. The separation member 158 is movable between the solid line position and the imaginary line position, and directs a document P transported along the path 138 to the document discharge tray 110 when set at the imaginary line position. The separation member 158 directs a document P to the re-feeding path 148 or to the document inverting unit 150 when set at the solid line position.

A second separation member 160 is provided on the inverting roller 142 side for directing a document directed by the separation member 158 positioned at the solid line position to either the re-feeding path 148 or the document inverting unit 150. The separation member 160 is movable between the solid line position and the imaginary line position, and directs a document P to the re-feeding path 1458 when set at the imaginary line position. The separation member 160 directs a document P to the document inverting unit 150 when set at the solid line position.

One end of the top guide 154 of the document inverting unit 150 extends between the inverting roller 142 and the pair of discharge rollers 146, so as to form a path 166 between the extended part 162 and the opposed guide 164. A pair of rollers 168 are arranged at the path 166 to transport a document from the document inverting unit 150 to the document discharge tray 110.

The document transporting operation of the document transport device 100 having the aforesaid construction is described below. A document P is placed on the document feed tray 108, as shown in the drawing. At this time, in the case of one-sided documents, the document surface is placed facing upward, whereas in the case of duplex documents, the document surface to be read first is placed facing upward. That is, in the case of both one-sided documents and duplex documents the documents are stacked in page sequence with the first page facing upward on the document feed tray 108. In this state, when a document feed command is output from the image processing apparatus to the document transport device, the document take-up roller 116 contacts the top surface of the uppermost document P, and feeds the uppermost document P to the right side in the drawing. At this time, the sheets below the uppermost document P is also fed to the right side in the drawing due to friction between this sheet and the uppermost document P. However, the sheets below the uppermost document P are separated from the uppermost document P between the roller 118 and the pad 120, so as to prevent their being fed. The document P which passes between the roller 118 and the pad 120 is directed into the path 122 and transported toward the platen 104 via the timing roller 124 and the timing of the reading signals.

When the leading edge of the document P reaches the top surfaced of the platen 104, the document P is transported in the arrow 170 direction along the top surface of the platen 104 via the rotation of the belt 134 of the document transport unit 128. When the document P has been transported to a predetermined reading position, the document p is stopped until the image reading is completed by the image processing apparatus 102. Then, when the image reading is completed, the document P is transported from the top of the platen 104 to the path 138 via the rotation of the belt 134.

When only one sheet of a one-sided document is placed on the document feed tray 108, the one-sided document P is ejected to the discharge tray 110 regardless of whether or not the front or back surface is facing upward, and poses not problem for the operator. In this instance, the first separation member 158 is moved to the imaginary line position, and the document P is transported by the roller pair 140, inverting roller 142, roller 144 abutting the inverting roller, and the discharge roller pair 146, and is ejected to the discharge tray 110 with the document surface facing upward.

When a plurality of documents P are stacked in the document feed tray 108, it is desirable that the page sequence of the documents P is maintained in the discharged state on the discharge tray 110. In the case of a plurality of documents, the first separation member 158 is moved to the solid line position. When reading only one side of a document P, the second separation member 160 is moved to the solid line position. As a result, a document P fed through the path 138 is transported to the document inverting unit 150 via the pair of feed rollers 140, inverting roller 142, roller 144, and feed roller pair 156. At this time the document surface is facing upward.

Then, when the trailing edge of the document P arrives directly anterior to the transport roller 156, the transport roller 156 temporarily stops and rotates in the reverse direction. In this way the trailing edge of the document P is fed into the path 166, and the read document is ejected to the discharge tray 110 with the document surface facing downward via the transport roller pair 168 and the discharge roller pair 146. The second and subsequent documents are similarly fed, and stacked in the document discharge tray 110 with the document surface facing downward.

When reading a duplex document, first the first separation member 158 is moved to the solid line position and the second separation member 160 is moved to the imaginary line position. In this way a document P fed through the path 138 is again transported onto the platen 104 via the re-feeding path 148. At this time the belt 134 reverse rotates to transport the document P in the arrow 172 direction. After the image is read, the document P is again fed into the path 138, and thereafter ejected to the discharge tray 110 with the initially read document surface facing downward without being transported to the document inverting unit 150 because the first separation member 148 has been switched immediately beforehand to the imaginary line position.

In the previously described embodiment, the documents P are stacked on the document feed tray 108 with the document surface to be read first facing upward when reading a plurality of documents, but when the document surface to be read first is placed facing downward, the document fed from the document feed tray 108 must be inverted front-to-back twice so that the document surface to be read is fed facing downward onto the platen 104. In this case, a pre-reading document inverting unit similar to the document inverting unit 150 may be provided between the document feed tray 108 and the platen 104 so as to invert a document front-to-back once when transporting documents from the document feed tray 108 to the document inverting unit, then inverting the document front-to-back once again when transporting the document from the document inverting unit to the platen 104. In this instance, the feed rollers are arranged below the document so as to contact the lowermost document stacked in the document feed tray 108.

In the document transport device of the present invention as described above, since a document feed tray, document discharge tray, and document inverting unit are provided above the platen of the document reading unit, the width of the document transport device in the lateral direction in FIG. 3 can be suppressed to the width of the image processing apparatus. Furthermore, because a plurality of documents are read in the page sequence, a compact facsimile machine or scanner can be realized.

In the aforesaid document transport device, consideration has been given to the use of the document re-feeding path 148 to direct a read document from the re-feeding path 148 onto the platen 104, and thereafter eject the document from the trailing edge to the document discharge tray 110. In this case, the ejected documents are stacked on the discharge tray 110 with the read document surfaces facing downward. However, in this arrangement the total document reading time is disadvantageously lengthened because the following document must be awaited to prevent interference impact between a document returning to the platen 104 and a following document transported to the platen 104. Accordingly, a read document is directed to the special document inverting unit 150 as previously described. In this way a document on the platen 104 is not interfered with. If the document reading is completed, a following document can be immediately directed onto the platen 104, thereby reducing the document reading time.

Although the document feed tray 108, document discharge tray 110 and the document inverting unit 150 are sequentially arranged vertically from the top down in the aforesaid document transport device, the arrangement sequence of the pre-reading document inverting unit is not limited to the aforesaid embodiment, and may be combined in a vertical relationship.

Although a specific construction of the first mode of FIG. 1 is shown in FIG. 3, the document transport device of the mode shown in FIG. 2 may be realized via modification of the construction shown in FIG. 3. Specifically, the feed roller 116 may be arranged so as to contact from below the lowermost document surface of the documents stacked on the document feed tray 108, so as to oppose the positional relationship of the roller 118 and the pad 120. In this way documents stacked on the document feed tray 108 are fed sequentially sheet-by-sheet from the bottom. Furthermore, a tray may be added between the document feed tray 108 and the document transporting unit 128, and a feed roller capable of reverse and forward rotation may be provided between the added tray and the path 122. A document is transported from the path 122 onto the added tray via the standard rotation of the feed roller, and a document is fed from the added tray to the path 122 and the transport unit 128 via the reverse rotation of the feed roller.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A sheet transport device for transporting sheet to a predetermined position, said sheet transport device comprising:
   a first accommodating portion which is disposed above the predetermined position and which accommodates a plurality of sheets;
   a second accommodating portion disposed above the predetermined position;
   a third accommodating portion disposed above the predetermined position;
   a first sheet transport path for feeding the plurality of sheets accommodated in said first accommodating portion sequentially from the uppermost sheet, inverting the sheets front-to-back, and transporting the sheets to the predetermined position;
   a second sheet transport path for inverting front-to-back the sheet which is transported to the predetermined position by said first transport path, and transporting the sheet to said second accommodating portion; and
   a third sheet transport path for inverting front-to-back the sheet which is accommodated by said second accommodating portion, and transporting the sheet to said third accommodating portion.

2. A sheet transport device as claimed in claim 1, wherein said third accommodating portion is positioned above said second accommodating portion, and said first accommodating portion is positioned above said third accommodating portion.

3. A sheet transport device as claimed in claim 1, wherein said sheet transporting apparatus is attachable to an image processing apparatus, and said predetermined position corresponds to an image reading position of the image processing apparatus when the sheet transport device is attached to the image processing apparatus.

4. A sheet transport device for transporting sheet to a predetermined position, said sheet transport device comprising:
   a first accommodating portion which is disposed above the predetermined position and which accommodates a plurality of sheets;
   a second accommodating portion disposed above the predetermined position;
   a third accommodating portion disposed above the predetermined position;
   a fourth accommodating portion disposed above the predetermined position;
   a first sheet transport path for feeding the plurality of sheets accommodated in said first accommodating portion sequentially from the lowermost sheet, inverting the sheet front-to-back, and transporting the sheet to said second accommodating portion;
   a second sheet transport path for inverting front-to-back a sheet which is accommodated in said second accommodating portion, and transporting the sheet to the predetermined position;
   a third sheet transport path for inverting front-to-back the sheet which is transported to the predetermined position by said second transport path, and transporting the sheet to said third accommodating portion; and
   a fourth sheet transport path for inverting front-to-back the sheet accommodated in said third accommodating portion, and transporting the sheet to the fourth accommodating portion.

5. A sheet transport device as claimed in claim 3, wherein said second accommodating portion is positioned above said third accommodating portion, said forth accommodating portion is positioned above said second accommodating portion, and said first accommodating portion is positioned above said fourth accommodating portion.

6. A sheet transport device as claimed in claim 3, wherein said sheet transporting apparatus is attachable to an image processing apparatus, and said predetermined position corresponds to an image reading position of the image processing apparatus when the sheet transport device is attached to the image processing apparatus.

7. A sheet transporting method for transporting sheet to a predetermined position, said sheet transporting method comprising steps of:
   feeding a plurality of sheets accommodated in a first accommodating portion sequentially from the uppermost sheet, said first accommodating portion being disposed above the predetermined position;
   inverting said fed sheets front-to-back, and transporting the sheets to the predetermined position;
   inverting front-to-back the sheet transported to the predetermined position, and transporting the sheet to a second accommodating portion, said second accommodating portion being disposed above the predetermined position; and
   inverting front-to-back the sheet accommodated in said second accommodating portion, and transporting the sheet to a third accommodating portion, said third accommodating portion being disposed above the predetermined position.

8. A sheet transporting method as claimed in claim 7, wherein said third accommodating portion is positioned above said second accommodating portion, and said first accommodating portion is positioned above said third accommodating portion.

9. A sheet transporting method as claimed in claim 7, wherein said sheet transporting method is used in an image processing apparatus, and said predetermined position corresponds to an image reading position of the image processing apparatus.

10. A sheet transporting method for transporting sheet to a predetermined position, said sheet transporting method comprising steps of:
    feeding a plurality of sheets accommodated in a first accommodating portion sequentially from the lowermost sheet, a first accommodating portion being disposed above the predetermined position;
    inverting said fed sheet front-to-back, and transporting the sheet to the second accommodating portion, said second accommodating portion being disposed above the predetermined position;
    inverting front-to-back the sheet accommodated by said second accommodating portion, and transporting the sheet to the predetermined position;
    inverting front-to-back the sheet which is transported to the predetermined position, and transporting the sheet to a third accommodating portion, said third accommodating portion being disposed above the predetermined position; and
    inverting front-to-back the sheet accommodated in said third accommodating portion, and transporting the sheet to a fourth accommodating portion, said fourth accommodating portion being disposed above the predetermined position.

11. A sheet transporting method as claimed in claim 10, wherein said second accommodating portion is positioned above said third accommodating portion, said forth accommodating portion is positioned above said second accommodating portion, and said first accommodating portion is positioned above said fourth accommodating portion.

12. A sheet transporting method as claimed in claim 10, wherein said sheet transporting method used in an image processing apparatus, and said predetermined position corresponds to an image reading position of the image processing apparatus when the sheet transport device is attached to the image processing apparatus.

\* \* \* \* \*